US008254895B2

(12) United States Patent
Holdsworth

(10) Patent No.: US 8,254,895 B2
(45) Date of Patent: Aug. 28, 2012

(54) METHODS AND APPARATUS FOR GENERATING MOBILE INTERNET PAGES FOR VIEWING BY MOBILE COMMUNICATION DEVICES

(75) Inventor: Richard Brian Mark Holdsworth, Bromsgrove (GB)

(73) Assignee: Wapple.net Ltd, Redditch, Worcestershire (GB)

( * ) Notice: Subject to any disclaimer, the term of this patent is extended or adjusted under 35 U.S.C. 154(b) by 693 days.

(21) Appl. No.: 11/738,436

(22) Filed: Apr. 20, 2007

(65) Prior Publication Data

US 2008/0176544 A1    Jul. 24, 2008

(30) Foreign Application Priority Data

Jan. 18, 2007    (EP) .................................... 07001002

(51) Int. Cl.
*H04L 29/06*    (2006.01)
(52) U.S. Cl. .................................. 455/414.3; 455/414.4
(58) Field of Classification Search ............... 455/414.3, 455/414.4
See application file for complete search history.

(56) References Cited

U.S. PATENT DOCUMENTS

| 2003/0023755 | A1* | 1/2003 | Harris et al. ................... 709/246 |
| 2003/0158969 | A1  | 8/2003 | Gimson et al. |
| 2004/0049574 | A1* | 3/2004 | Watson et al. ................. 709/224 |
| 2004/0049737 | A1* | 3/2004 | Simon Hunt et al. ......... 715/513 |
| 2006/0184639 | A1* | 8/2006 | Chua et al. .................... 709/217 |

FOREIGN PATENT DOCUMENTS
EP    07001002.0    6/2007

OTHER PUBLICATIONS

Timothy W. Bickmore et al., "Digestor: device independent access to the World Wide Web," Computer Networks and ISDN Systems, vol. 29, pp. 1075-1082 (Sep. 1997).
Fumihiko Kitayama et al., "Design of a Framework for Dynamic Content Adaptation to Web-Enabled Terminals and Enterprise Applications," Proc. Software Engineering Conference, pp. 72-79 (Dec. 7, 1999).
Wei-Ying Ma et al., "A Framework for Adaptive Content Delivery in Heterogeneous Network Environments," http://www.cooltown.hp.com/papers/adcon/MMCN2000 (Jan. 24, 2000).
Masahiro Hori et al., "Annotation-based Web content transcoding," Computer Networks, vol. 33, pp. 197-211 (Jun. 2000).
Search Report of Counterpart EP Patent Application No. 07001002, Jun. 25, 2007, Wapple.net Ltd.
Communication of Counterpart EP Patent Application No. 07001002, Mar. 19, 2009, Wapple.net Ltd.
Reply to Mar. 19, 2009 Communication of Counterpart EP Patent Application No. 07001002, Nov. 16, 2009, Wapple.net Ltd.

* cited by examiner

*Primary Examiner* — Jinsong Hu
*Assistant Examiner* — Michael Nguyen
(74) *Attorney, Agent, or Firm* — James Trosino

(57) ABSTRACT

A system is provided for generating mobile internet pages for mobile communication devices. The system includes a plurality of data chunks, a page repository containing page structures, the page structures including a list of the data chunks, and a database including data relating to mobile communication devices of different configurations and information on adaptations to be made to data chunks corresponding to the different configurations. On receipt of a page request from an identified type of mobile communication device, the system selects a page structure from the page repository, identifies the data chunks listed in the selected page structure, retrieves specific information from the database corresponding to the identified model, uses the specific information to separately adapt each of the identified chunks according to the specific information, and compiles a mobile internet page by combining the separately adapted data chunks.

24 Claims, 9 Drawing Sheets

METHODS AND APPARATUS FOR GENERATING MOBILE INTERNET PAGES FOR VIEWING BY MOBILE COMMUNICATION DEVICES

REFERENCE TO RELATED APPLICATIONS

This application claims priority from European Patent Application Serial No. 07001002.0, filed 18 Jan. 2007, which is incorporated by reference herein in its entirety.

BACKGROUND

This invention relates to a mobile web page computer systems for generating mobile internet pages for viewing by mobile telephones. In particular, but not exclusively, the invention relates to a central management of a mobile internet site that dynamically adapts pages to suit the strengths, weaknesses and capabilities of different mobile devices that browse it.

Presently most modern mobile telephones and devices (including pocket PCs with mobile connections) are equipped with some form of mobile internet browser. Some of these browsers are capable of viewing sites designed for viewing by personal PCs via the conventional internet whilst others are designed for only viewing pages purpose build for viewing by mobile telephone such as by WAP or I-mode. However, even with devices that can browse conventional sites it is common to construct specific mobile internet pages that are more specifically designed for easy navigation using a mobile telephone. In particular they may be designed to attempt to fit most of the page within the relatively small screen provided by most mobile telephones and better suited to navigation constraints.

Mobile devices with mobile internet browsers have significant variations in screen size, capabilities and limitations. Accordingly one specifically created mobile internet page may be viewable by one particular mobile device but on another device may not view at all or may be of unsuitable proportions such that it is difficult to navigate effectively. For example if the website is designed for a mobile phone with a large screen, a device with a smaller screen will not be able to fit all the mobile web-page on its screen. More significantly still a webpage could be designed with items such as graphical links which less advanced mobile devices may not be able to process, resulting in failure of the page.

Accordingly in order to allow multiple mobile devices to use the web-site effectively, multiple versions of the entire internet site are frequently created to cover all normal mobile devices on which users may be browsing them.

Different mobile devices require pages to be sent to them using different mark up languages and different devices deviate from set standards in some form or other. Some handsets are even found to contain bugs in their browsers that mean that what works correctly in mark up fails upon delivery to the device. Additionally the file formats of different handsets can download vary from model to model. This affects images, videos, audio files and capabilities, style of page with colours and font.

In order to cater for these differences mobile internet developers commonly categorize mobile telephone models into groups and builds a web site for each group. This has the disadvantage that the user must build and maintain multiple versions of the same site. In order to limit the number of builds the devices are normally grouped together in broad groups which mean less than perfect delivery to some devices which are not perfectly defined by the group definition. The narrower the group the better the delivery but the more extra sites that must be designed. When a new device emerges this must be either assigned to a new group or another version of the site must be created. Additionally some devices may be developed with new capabilities and these will be overlooked or underused.

SUMMARY

It is an object of the current invention to mitigate and/or overcome the problems discussed above. In particular the technical problems of having to compile, store and operate a separate site for separate phones and of websites being unsuitable for the phones browsing them are solved by storing and installing functionality and features of pages as data chunks and compiling the pages of a site from data chunks in the manner defined in the claims.

In accordance with a first aspect of the invention there is provided a web page computer system for generating web pages for viewing by communication devices preferably configured for each device, the system comprising a memory, a processor, an input for receiving a request for one or more web pages from communication devices, a plurality of data chunks stored in the memory, each data chunk corresponding to a specific purpose/function, page generation means for compiling a web page from data chunks stored in the memory, chunk selection means for selecting chunks in the memory that correspond to a page request for enabling the page generation means to compile a page corresponding to the request, chunk adaptation means to adapt data chunks, a database stored in the memory comprising data relating to a plurality of communication devices of different configurations and information on adaptations to be made to data chunks corresponding to the different configurations, wherein the server is configured so that on receipt of a page request from an identified model of communication device at the input, the chunk selection means determines which data chunks should be used to compile a page to be viewed by the requester, specific information is retrieved from the database corresponding to the identified model, (and preferably the determined chunks) the chunk adaptation means uses the specific information to adapt each of the determined chunks in accordance with the specific information, and the page generation means compiles a page from the adapted data chunks for sending to the identified mobile telephone, and preferably transmits the page so that it is operably accessed by the communication device that sent the page request.

Further aspects and features of the invention are set out in the claims. Embodiments of the invention will now be described, by way of example only.

BRIEF DESCRIPTION OF THE DRAWINGS

Features of the present invention can be more clearly understood from the following detailed description considered in conjunction with the following drawings, in which the same reference numerals denote the same elements throughout, and in which.

DETAILED DESCRIPTION

Figure 1:
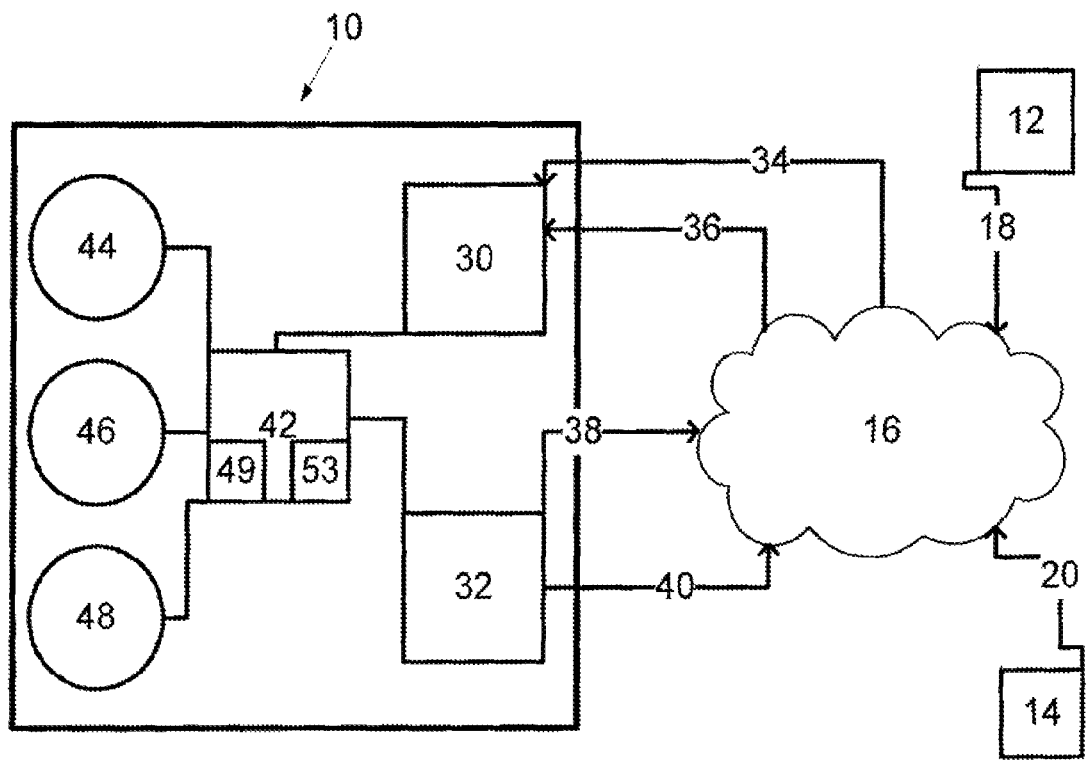
FIG. 1 is a schematic representation of a computer system in communication with mobile devices in accordance with the invention.

Referring to FIG. 1 there is shown a mobile internet page computing system 10, cellular telephones 12 and 14 and mobile internet infrastructure 16.

The cellular telephones 12 and 14 and mobile internet infrastructure 16 are conventional, the system 10 therefore can be used with already existing infrastructure which is used for transmitting mobile internet to cellular telephones via micro transmitters, etc. Instead of cellular telephones using GSM or CDMA or other microwave based technology, devices can be any other wireless communication device which has an internet browser preferably a mobile internet browser. Advantages of the invention are greatest when used with devices such as those of 12 and 14 with different configurations and in particular where the screen size is small and of different sizes for connecting devices 12 and 14. Accordingly this could include PDAs with WiFi connections. Presently the system is particularly well suited for use with cellular telephones of a GSM or CDMA type using a WAP browser over GPRS, or running a mobile browser on a so called smart phone or pocket PC platform such as Windows mobile or Symbian.

Each of the mobile telephones 12 and 14 have two way communication paths, 18 and 20 with the mobile internet infrastructure 16 which, in the example of cellular telephones would be by way of microwave.

The computer system 10 in this example comprises a single server with a processor and memory such as a hard drive. Alternatively the system could be implemented on different computers with multiple processors and memory storage devices so long as the corresponding components are in suitable communication with each other.

As well as a processor and memory (not shown) the system 10 comprises an input 30 output 32, a main technology engine 42 and repositories forming part of the memory, chunk repository 44, page repository 46 and device profiler 48.

The input 30 is in communication with the main technology engine 42 and has the means for receiving data sent from the mobile internet infrastructure 16. The input signals are identifiably distinct, such as requests 34 and requests 36, which whilst they come via the infrastructure 16 are still individually identifiable as coming from a particular telephones 12 and 14 respectively. Input 30 can be implemented using a number of conventional technologies including wireless receivers etc. Output 32 may comprise a wireless transmitter and sends signals 38, 40 in such a way as to be sent to a specific mobile device 12 and 14. For example, by sending it with a specific telephone number in the same manner as a conventional mobile telephone call.

Chunk repository 44 is a database containing specific data chunks which will be described in more detail below.

Page repository 46 is a database containing page structures each of which comprise a list of references to data chunks contained in chunk repository 44.

The device compiler 48 is in communication with the main technology engine 42 and contains information relating to different types of known mobile telephone device and information on how chunks should be adapted to meet the requirements of those different telephone devices.

The main technology engine 42 may comprise a combination of software and hardware such as the processor and programming which performs the major functions of the invention and in particular the ability to compile mobile internet pages. The engine 42 is in communication with all of the other components, 30, 32, 44, 46 and 48. The engine 42 itself further includes an identifier 49 in communication with input 30 which can identify the mobile telephone 12 or 14 from which the signal 34 is transmitted and an adaptor 53 for adapting chunks from the chunk repository 44. The identifier 49 is directly in communication with the device profiler 48. In alternative embodiments the identifier does not form part of the system of the invention, with the identification being done externally.

Figure 2:
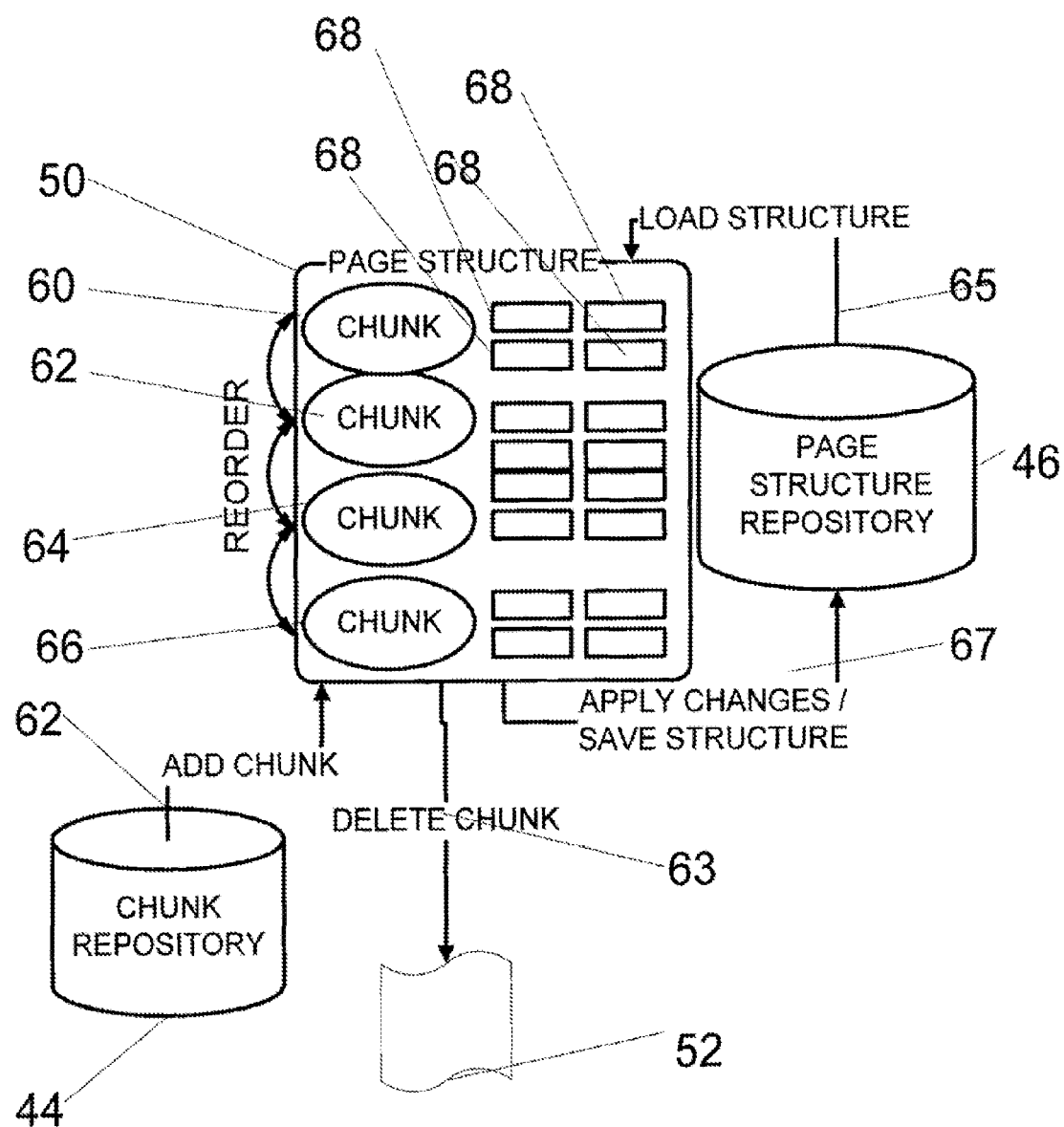
FIG. 2 is a schematic representation of a page structure created by the system of figure one with accompanying relevant components of the system of FIG. 1.

Referring to FIG. 2 there is shown a single page structure 50, as stored in the page structure repository 46.

The page structure comprises a list of chunks of a particular type in a particular order. The order in the structure 50 corresponds to vertically stacked order in which the page components, constructed from the chunks, will be present in the completed page sent from output 32. In FIG. 2, this order is depicted by showing the different chunks in a vertical hierarchy.

In this example page structure 50 comprises four chunks, chunk type A, 60, chunk type B, 62, chunk type C, 64 and chunk type D, 66 and each chunk comprises a number of settings 68. Settings 68 may be values, text labels, on/off options or conditional rules. Each of the chunks 60 to 66 fulfils a specific purpose on the completed page and maybe individual configured and styled. The individual configuration styled is determined by the settings 68. Changing these settings will alter the purpose and style of the chunk.

The chunk itself may be considered an abstract description of the desired result. The generated markup of the completed page sent from output 32 is a result of decisions made by the engine 42 based on the requirements of the chunk, the settings configured by the site builder and the capabilities of the device 12.

Individual chunks may be positioned with a page structure in any position, with the order stored as part of the page structure 50.

The system 10 can alter any of the stored page structures in repository 46. This can be done, for example, by adding another chunk from chunk repository 44 via path 61. Additionally any of the current chunks 60, 62, 64 and 66 can be deleted at any time via path 70 to a deletion repository 52.

Each chunk itself can also be modified. This can be done through the easy manipulation of one or more of the settings 68.

To edit the page structure 50, it is first loaded from the page structure repository 46 via path 65. If the changes are applied and saved the page structure 50 sent back in modified form to the repository 46 via path 67.

Figure 3:
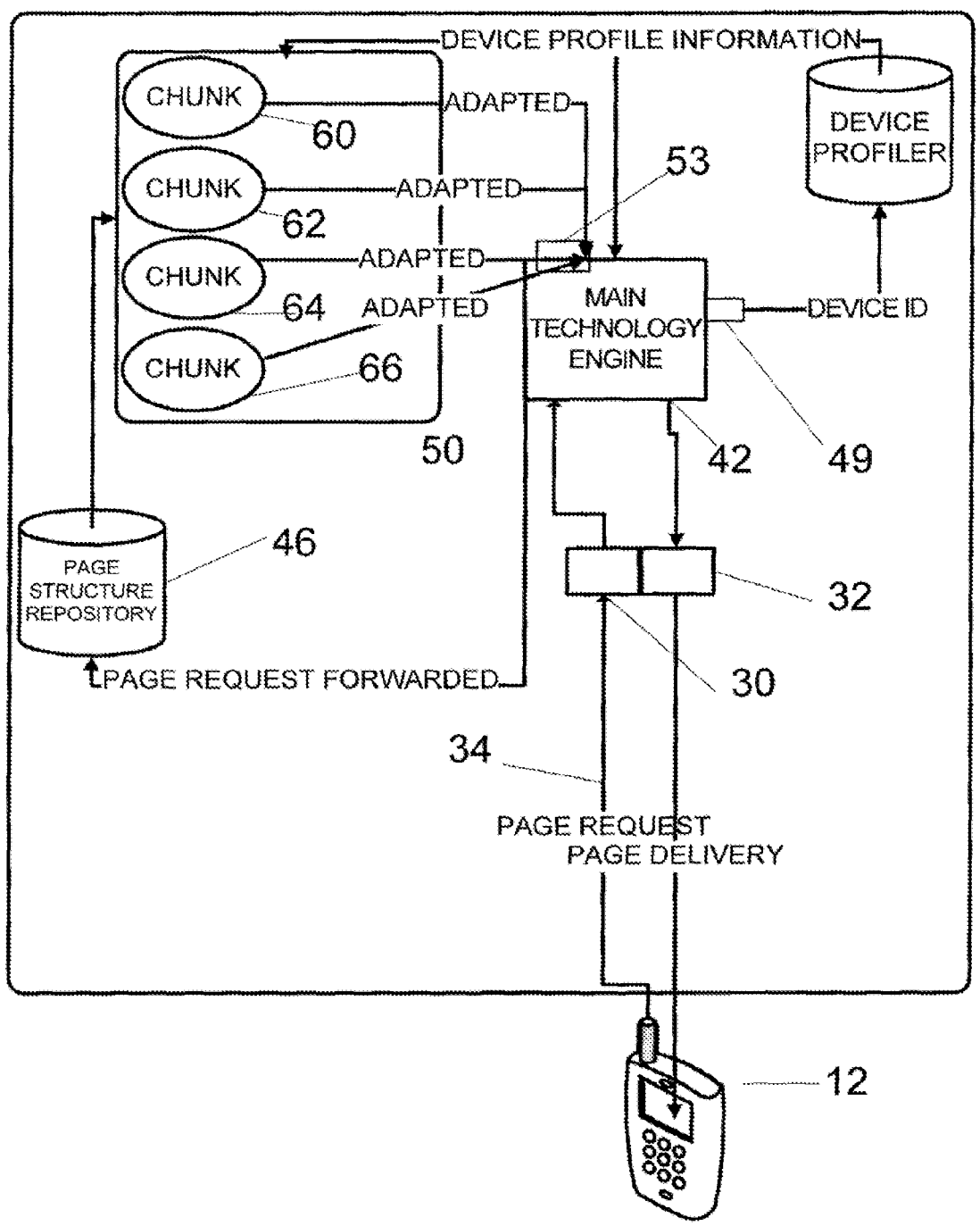
FIG. 3 is a schematic representation of components of the system of FIG. 1 registering and responding to page request.

Referring to FIG. 3 there is shown page structure 50 in connection with main technology engine 42, device profiler 48, and page structure repository 46.

Figure 4:
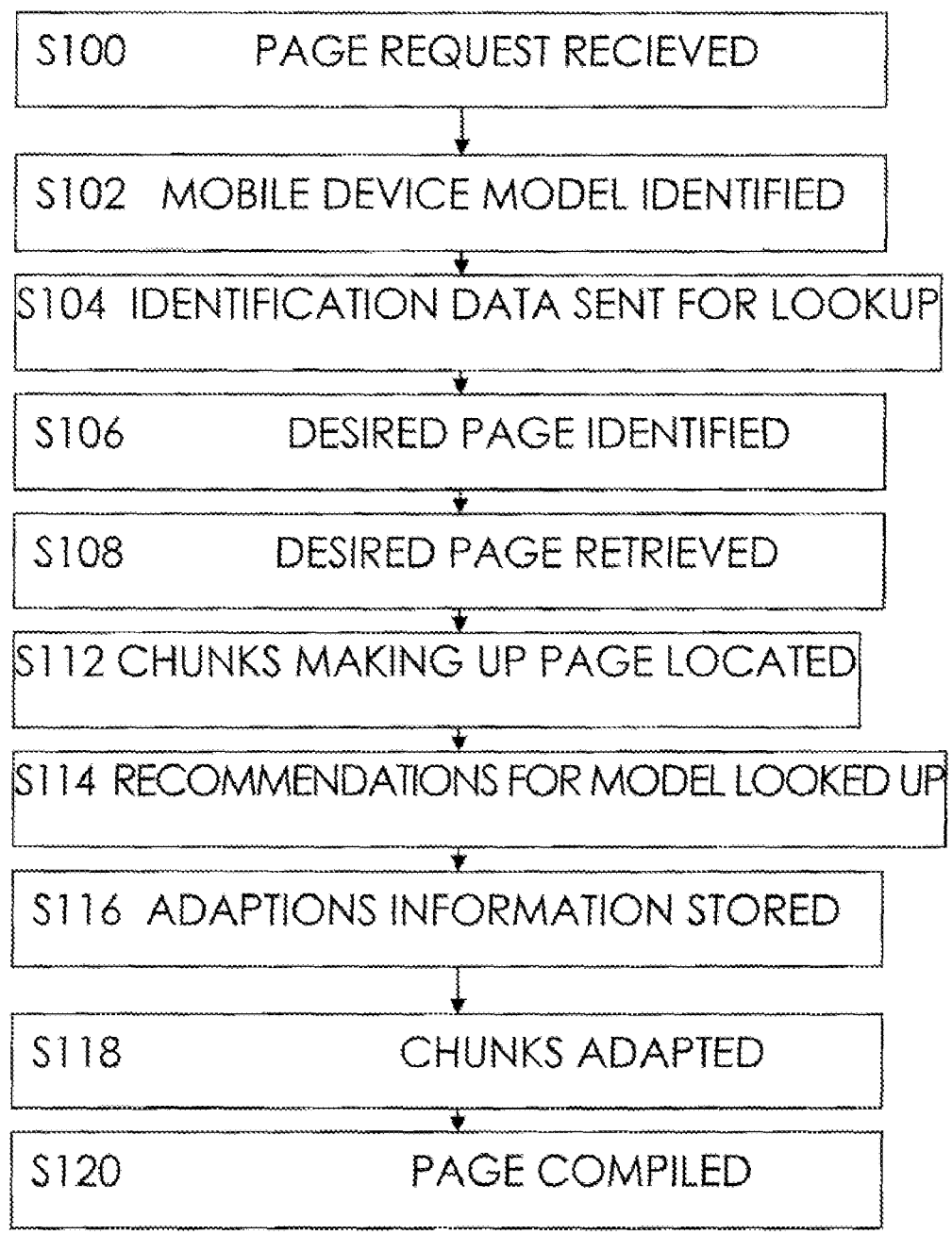
FIG. 4 is a flow chart of the process of registering and responding to a page request in accordance with the invention.

Referring to FIG. 4 there is shown a flowchart of the process of delivering a page to a mobile telephone 12 in response to a page request via signal 34 to the input 30.

At step S100 a page request signal 34 is received by input receiver 30 and sent on to the main engine 42. At step S102 the identifier 49 identifies the model of mobile telephone 12 from which the signal 34 was sent. Identifier 49 uses handset recognition code.

At step S104 the handset identification data is sent to the device profiler 48. Next at step S106, the main technology engine 42 uses parts of the page request signal 34 to identify the page desired by the user of the telephone 12. This is done conventionally, in the same manner that a mobile internet server generally identifies which mobile internet page is to be displayed. At step S108, this information regarding the desired page is sent to the page structure repository 46. System 10 locates the page structure 50 stored within the page structure repository 46 that corresponds to the page requested. This page structure 50 is then taken from the page structure repository to be processed by the main technology in 42.

The page structure 50 in the example in FIG. 3 is illustrated as comprising four chunks, 60, 62, 64 and 66 in a set order. These chunks 60, 62, 64 and 66 themselves may be stored in the page structure repository as part of the page structure 50. Alternatively the page structures in repository 46 may store simply an identifier corresponding to a particular chunk and during step S112 the chunks corresponding to those identifiers are found in the chunk repository 44 and put together to form a preliminary page.

At step S14, which could run in parallel or before steps 106 to 112 as well as after, device profiler 48 looks up the stored information, in the form of a device profile concerning the adapting of chunks which corresponds to the particular model identified.

Device profiler 48 comprises a database of settings and a logic layer. The device identification is used to count relevant entries in the database of settings. There are many revisions of individual mobile handsets, with revision often having inconsistencies so that different adaptations may be needed for different devices of the same model and these are catered for by device profiler 48.

The logic layer translates this information about the handset into usable data that relates to the abilities of that device to handle mobile internet pages and content download. Profiler 48 preferably combines the data within the logic layer in order to make decisions that the best possible results are determined by that device.

For example, some handsets report that they support XHTML BASIC as their preferred markup language. However, if such a device does not support CSS for styling the page, it is considered more reliable to use WML as the markup language for this device. This ensures that all components are indeed visible on the page (a site builder may have chosen white text on a black background for their XHTML pages. However, without CSS support the background colour would not be honoured and the text would be invisible on the default white background).

At step S116 the information found by the device profile is then stored in a specific location in the memory for access by the main technology engine 42.

At step S118 the technology engine 42 takes the information from device profile 48 that has been stored in the memory and uses it with the adaptor 53 to make any changes to each of the chunks 60-66. Each of the chunks 60, 62, 64 and 66 are adapted by the adaptor 53 to best suit the device 12. The chunk's requirements to display elements are compared against the capabilities of the visiting device. This includes file format compatibility, layout restrictions, code markup and browser quirks.

All of the information sent to the handset may be stored in the memory at step S112 and then supplied by the adaptor to each chunk in turn with which ever parts are appropriate. Alternatively chunks 60 to 66 which have been recalled could also be sent to the device profiler 48 so that information relevant to those chunks is returned.

At step S120 the main technology 42 compiles a mobile internet-page consisting of the adapted chunks put together in the same order as the non adapted chunks 60, 66 in page structure 50. This compiled page is then sent to output 32 where it is transmitted as page delivery signal 38 to the specific mobile telephone 12.

Figure 5:
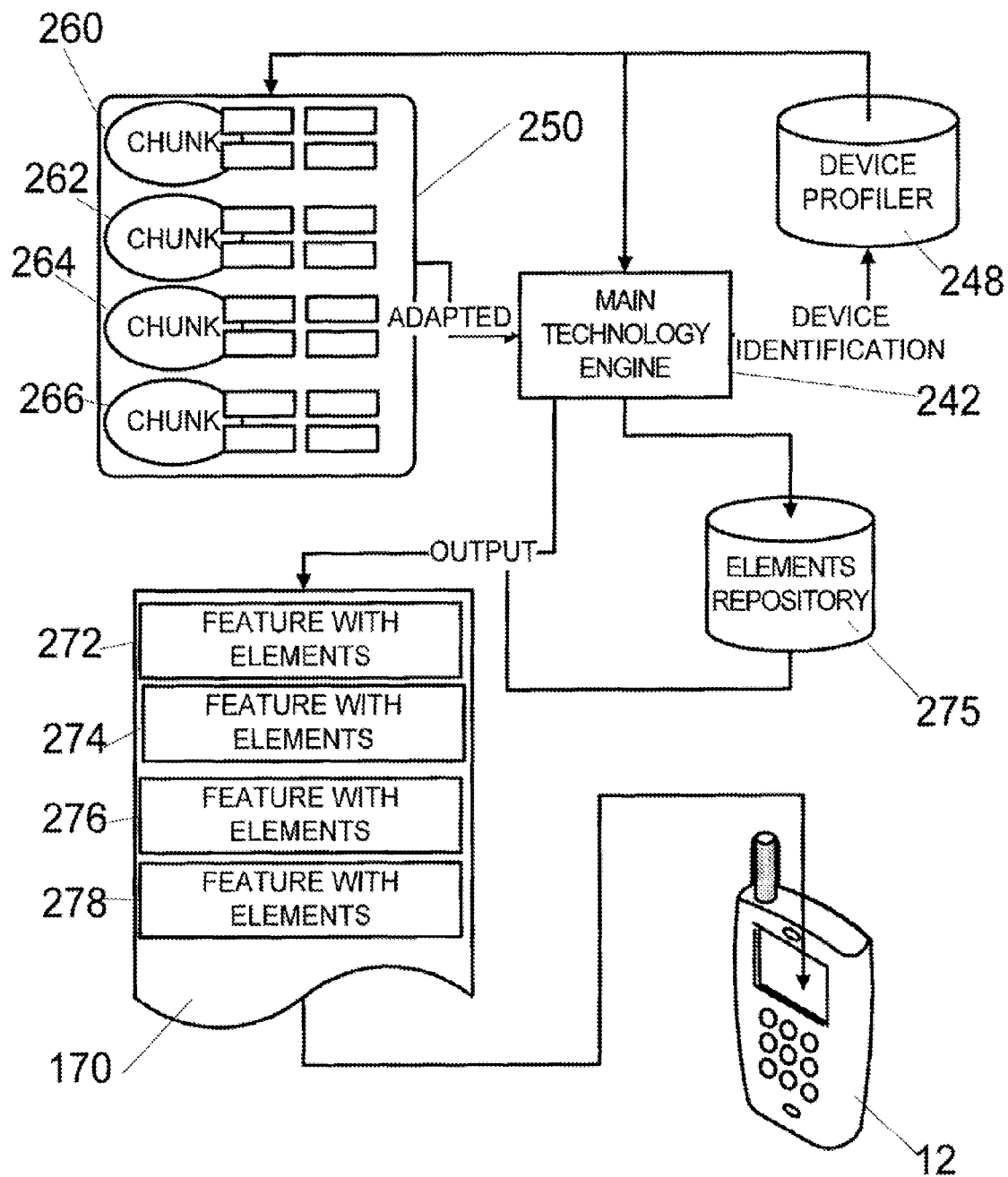
FIG. 5 is a schematic representation of page structure during adaptation with relevant components with the system of FIG. 1.
Figure 6:
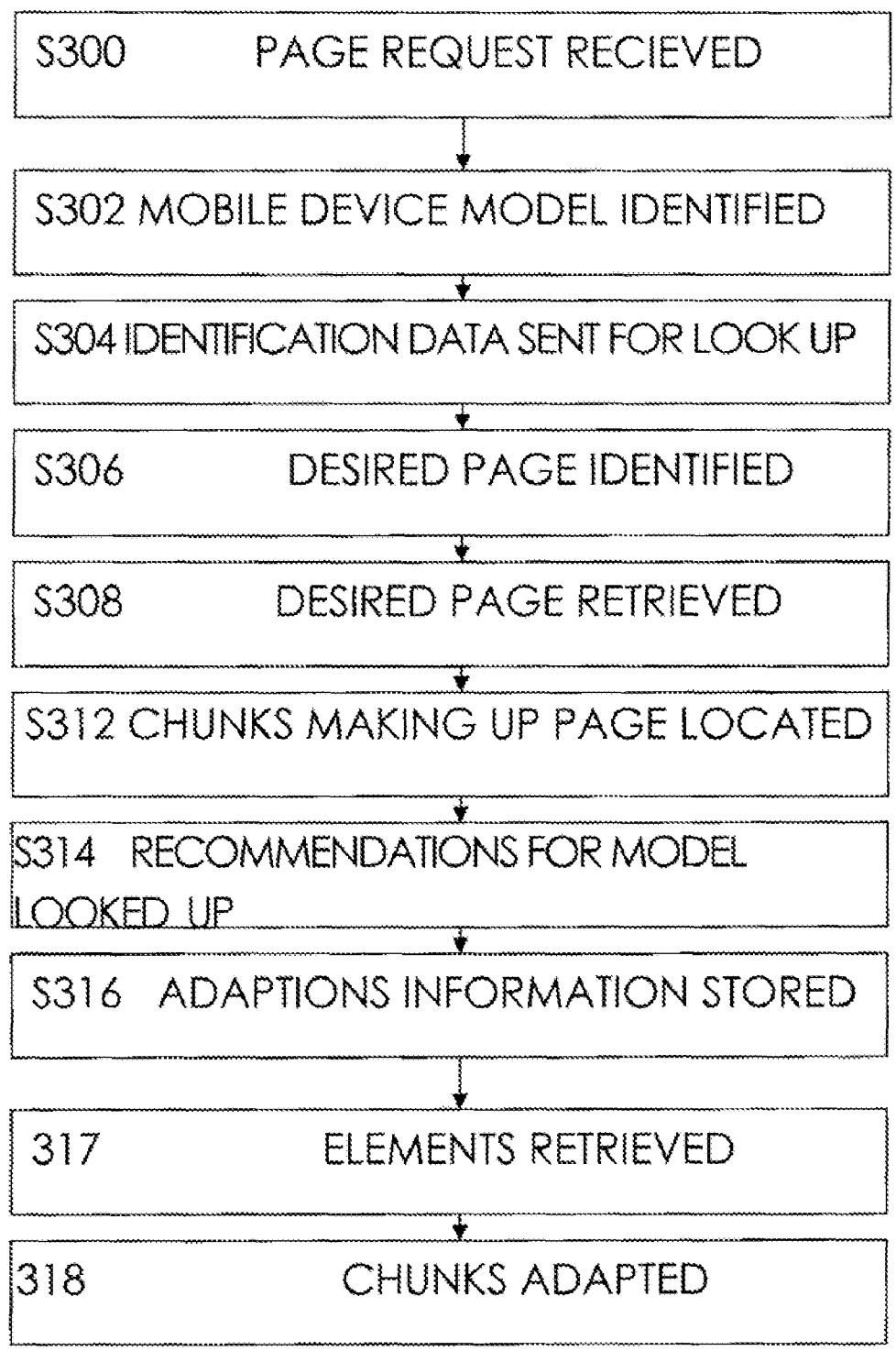
FIG. 6 is a flow chart of the process of adapting the page structure in accordance with the invention.

A second embodiment is shown in FIG. 5 and described in the flow process of FIG. 6. Components features and processors which are substantially similar or identical to those in embodiment 10 are given the same reference number but incremented by 200.

The main difference between system 10 and system 210 is that the stored chunks do not contain the final mark up language which will perform the resulting page 170 representations of this are held in an element repository 268. Element repository 268 forms part of the server 110 (not shown). In the process starting from step S200 the steps of providing the page structure as chunks, provides chunks which contain settings and relevant information to instruct the main technology engine 242 as to which elements are required and only after the adaptation steps S212 and S214 and further steps S215 and S217. The main technology engine 242 takes the adapted page structure 50 and locates the relevant elements from repository 268 before compiling the optimised page 270 comprising a list of features with elements 272, 274, 276 and 278 corresponding to the chunks 260, 262, 264 and 266 though there may be more than one feature per chunk.

As each chunk's requirements are processed so a completed piece of markup is created. This markup is composited into the whole page for final delivery to the device. Because each chunk has been individually processed, no individual chunk suffers from any degradation applied to a chunk in order to achieve display on a limited device.

When each chunk is processed according to the device profile information the settings and template are compared to and adjusted by the capabilities of the browsing device.

For example, some devices automatically place line breaks after images. In such a case, linebreaks that appear directly after an image are automatically removed (because to leave them in place would result in extra spacing on the page).

For example, different devices require different markup to form input elements. In such a case the template describes that an input box is required and the device profiling information instructs that element on how to display itself.

Figure 7:
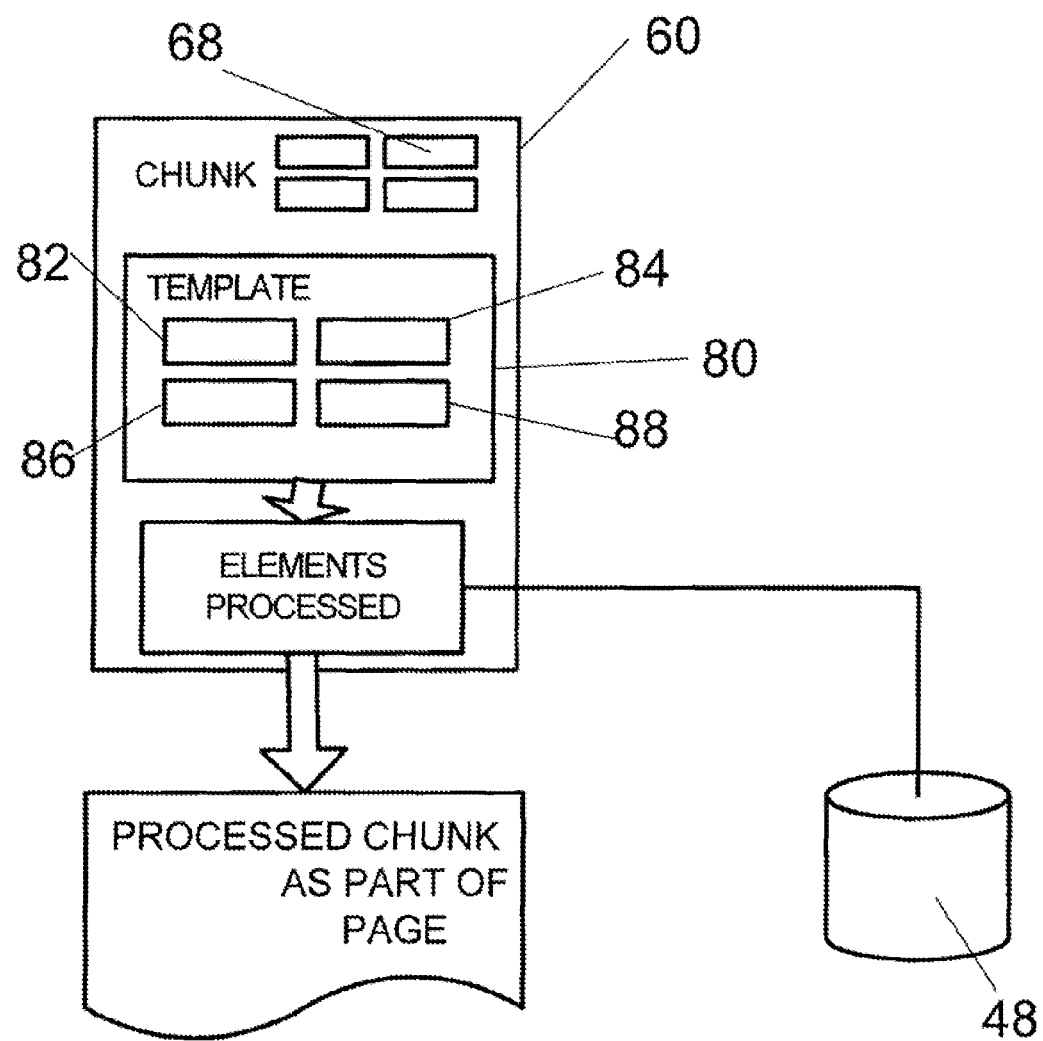
FIG. 7 is a schematic representation of a data chunk stored in the memory of the system of FIG. 1 together with further components of the system of FIG. 1.

Referring to FIG. 7 there is shown a sample of a template which dictates the look of a page component produced from a chunk 60. The template 80 comprises four elements, 82, 84, 86 and 88 which in system 10 are stored merely as identifiers and later located from the element repository 268 when required. The adaptor 53 may work on each of these individual elements, 82, 84, 86 and 88 separately or may work on the template as a whole 80 as well as adjusting to each of the individual settings.

There are different types of chunk available for various features and functions such as Chunks 60 to 66. A chunk is a unit of functionality that serves a purpose as a component when constructing a mobile internet page. Examples of chunks include: content galleries, user polls, chat, graphics, text, menus, language selection and user account management.

In most cases the site builder used system 10 or 210 simply places the chunk into a page structure and configures it to produce the result they want. Then the main engine 42 ensures that this configuration is adhered to on any device that visits it when processing data chunks.

For example, a user may place a graphic chunk onto a page and set its width to be 75% and alignment to be right. Regardless of the device type that views the page, the graphic will be at 75% of the screen width (mobile device screens vary in screen dimensions) and the graphic will always be delivered to the handset in a suitable file format (e.g., some older phones do not support jpg images and will only display GIF format images).

A user may place a video gallery chunk onto their page. They configure it to display four video previews per page and include purchase links. The system 10 considers the capabilities of the identified handset. If it does not support video downloads, or if the required format of video is not available on the site the chunk will either be omitted, or at the site builder's preference, a message informing the user that their device is incompatible will be displayed. In either case, the chunk has been configured for the device, ensuring that unsuitable content is not available and that the page is not cluttered with unnecessary content that would increase page download time.

Assuming that the device does support videos and the correct format is available on the site, the chunk will format the video thumbnail images according to the capabilities of the handset, the sizes configured by the site builder and the preference for layout determined by the site builder's chosen template. The template is also adjusted according to the capabilities of the device. For example, if the device is incapable of grid layout, the items of content will instead be delivered as a list A typical homepage may be constructed from a graphic chunk that displays the site logo, a text chunk that describes the site, a menu chunk through which other pages are accessed and a user account chunk where returning visitors can log in and access their previous purchases.

To the end user using their mobile device, chunks are invisible. They simply see a complete page.

Figure 8:
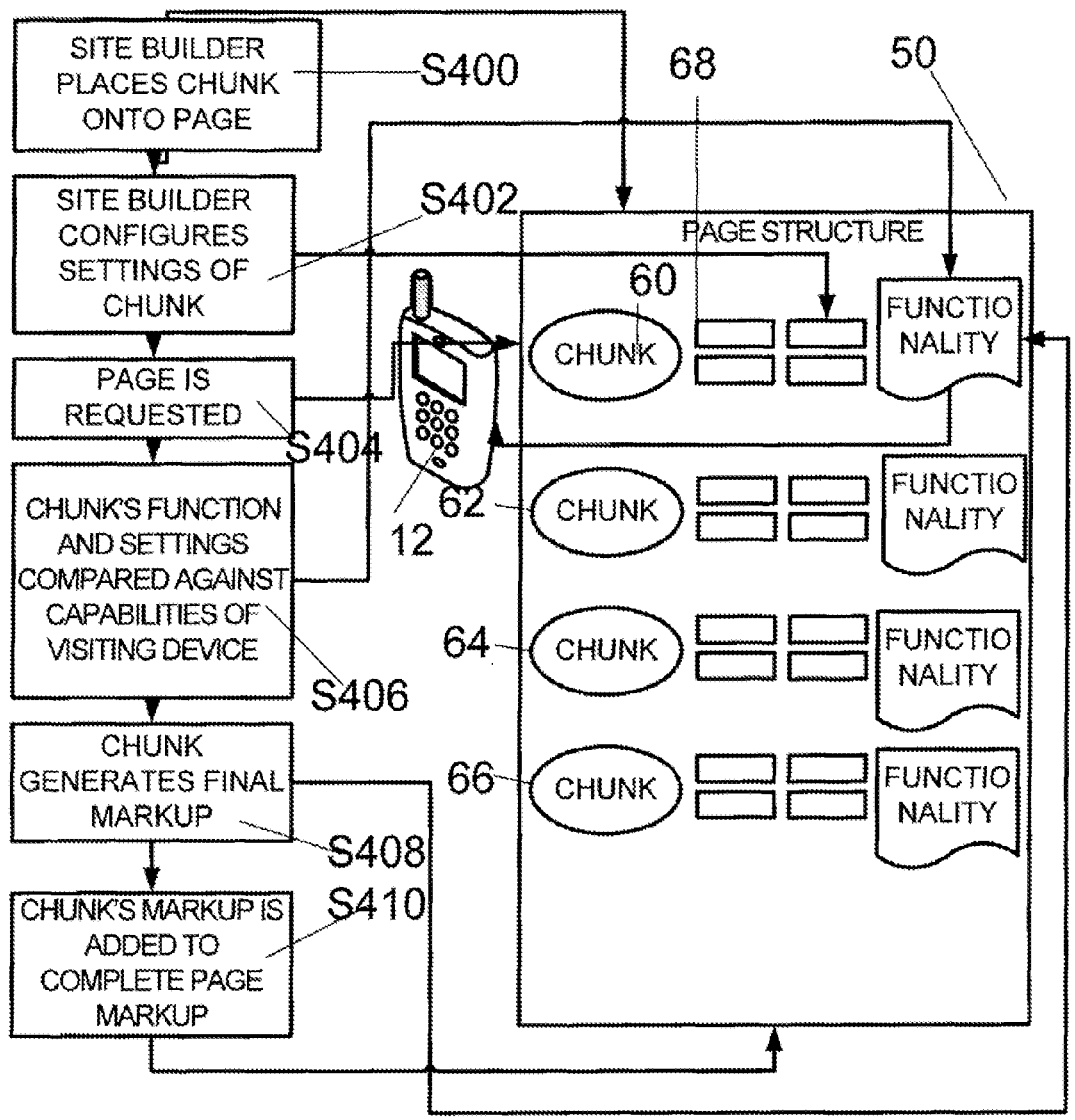
FIG. 8 is a flow chart of the processing of a data chunk of FIG. 7.

In FIG. 8 is shown the flowchart of the process of a chunk.

At step S410 site builder places a new chunk in a new chunk in the chunk repository and places this chunk or identifies this chunk into one or more page structures 50. At step S402 the site builder configures the settings 68 of the chunk. These settings are stored in the page structure 50 and the chunk 60 to 66.

At step S404 a page is requested by device 12 and at step S406 the chunks function and settings 68 are compared against capabilities of this device by device profiler 48. At step S408 the engine 42 generates final markup from a chunk bearing in mind the comparisons of the device profiler and at step S410 this final markup generated from the chunk is added to the completed page for delivery to the telephone 12.

An example of a page request being processed can be given with the reference to a user. A site builder constructs a home page, the first page that users will see when they visit his site.

Using system 10 or 110, the site builder places a 'site-graphic' chunk at the top of his homepage. He instructs this chunk to display a company logo at 75% of the screen width. Beneath this chunk, the site builder adds a menu chunk that will link through to other pages. The site builder configures this chunk to display graphical links rather than just plain text and decides that these graphical links are to be shown at 50% of the screen width.

User 1 and user 2 attempt to look at his homepage on their own mobile phones.

User 1 is browsing the site on a relatively old phone. This phone is capable of displaying only WML (wireless markup language) pages and has a relatively small screen, only 128 pixels across. It also has a few quirks that mean it cannot display graphics as links and must display each link on a separate line within a page.

When the page loads, User 1 sees the company logo at 96 pixels width by its relative height. The graphic is displayed on the page in GIF (Graphical Interchange Format) as this is the preferred colour graphic format for this phone.

The menu beneath it comprises of only text links that take him to other pages.

Meanwhile, User 2 on a newer more advanced device. This more modern device views pages of XHTML Mobile Platform (a code language that represents the second generation of the mobile internet standards). It is perfectly capable of displaying graphical links and has a screen width of 240 pixels.

User 2 sees the company logo 180 pixels width by its relative height. Although it is larger, it loads faster than on User 1's phone as the modern device is capable of receiving JPEG (Joint Photographic Experts Group) format which are more highly compressed for transmission.

Beneath the logo, User 2 can see the menu, complete with graphical links that can be selected and "clicked on." Each graphic is shown at 90 pixels width.

Figure 9:
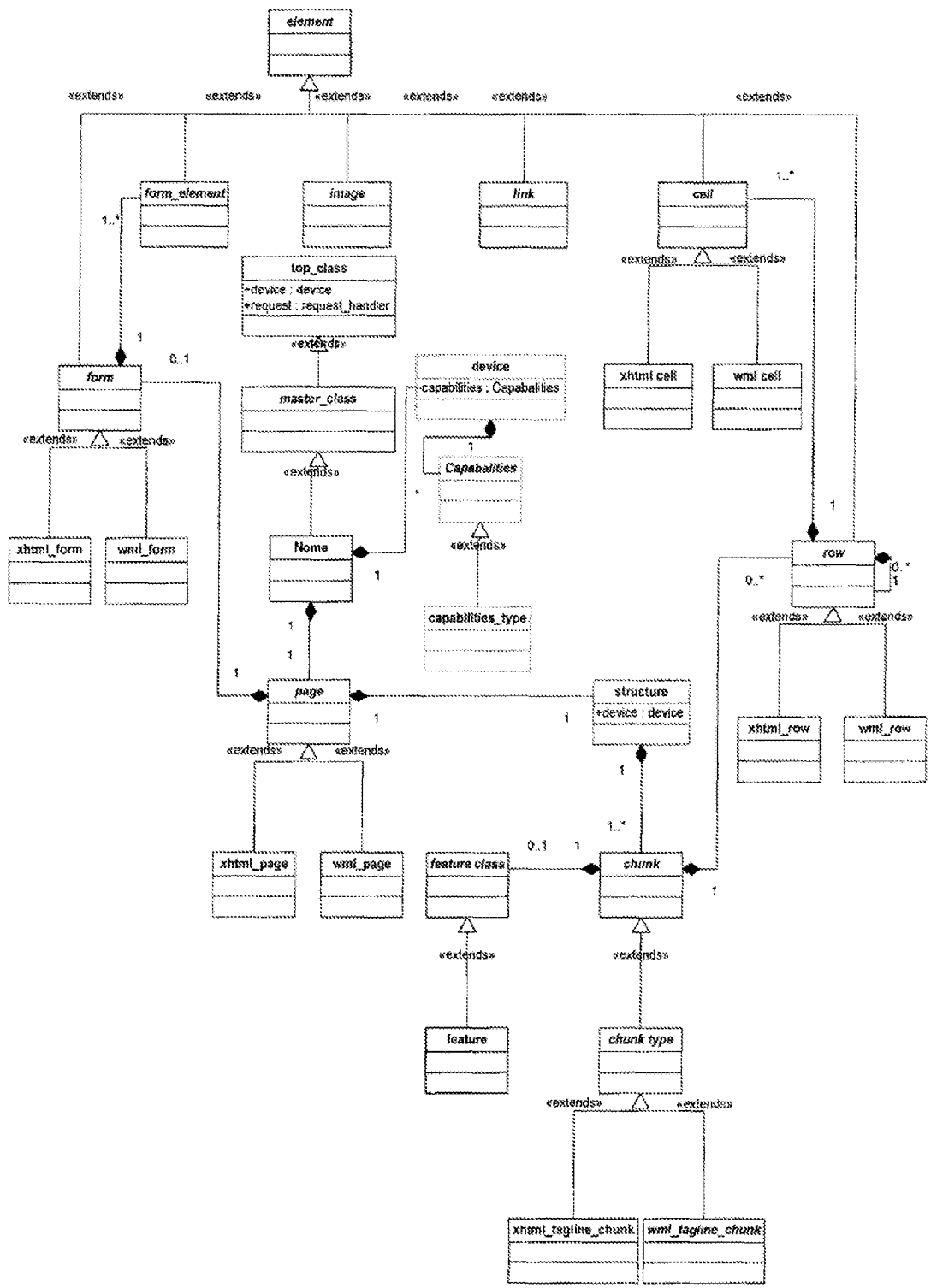
FIG. 9 is an overview UML diagram of key code components.

In FIG. 9 is shown an overview UML diagram of key code components.

In alternative embodiments the invention may be used to generate and send web pages to a variety of devices rather than mobile internet pages top mobile devices.

The foregoing merely illustrates the principles of this invention, and various modifications can be made by persons of ordinary skill in the art without departing from the scope and spirit of this invention.

The invention claimed is:

1. A mobile internet page computer system for generating mobile internet pages for viewing by mobile communication devices, the system comprising:
   a memory, a processor, and an input for receiving a request for one or more mobile internet pages from mobile telephones;
   a plurality of data chunks stored in the memory;
   a page repository containing a plurality of page structures, one or more page structures comprising a list of a plurality of the data chunks, wherein each data chunk has a specific purpose/function on a completed mobile internet page; and
   a database stored in the memory comprising data relating to a plurality of mobile communication devices of different configurations and information on adaptations to be made to data chunks corresponding to the different configurations,
   wherein the computer system is configured so that on receipt of a page request from an identified type of mobile communication device at the input, the system:
   selects a page structure stored in the page repository;
   identifies the data chunks listed in the selected page structure,
   retrieves specific information from the database corresponding to the identified model, uses the specific information to separately adapt each of the identified chunks in accordance with the specific information, and compiles a mobile internet page by combining the separately adapted data chunks.

2. The system of claim 1, wherein the system compiles the page from data chunks in a set order.

3. The system of claim 2, wherein one or more of page structure lists includes the set order, and the system compiles the page from identified chunks in the listed order in the page structure.

4. The system of claim 1, wherein adaptation of data chunks includes omitting one or more the chunks from the page compilation.

5. The system of claim 1, wherein the data chunks content galleries, user polls, chat, graphics, text, menus, language selection and user account is for a specific purpose for completed pages.

6. The system of claim 1, wherein one or more chunks has a number of settings preferably including one or more of a value, text label, on/off options or conditional rule.

7. The system of claim 6, wherein the individual configuration of a chunk is determined by the settings and the settings are editable to allow the purpose and style of the chunk to be changed.

8. The system of claim 1, wherein one or more data chunks comprise one or more definable settings, template alternatives and/or page elements that contribute the final mark up for that chunk.

9. The system of claim 8, further comprising an elements repository containing elements, such as line(s) of markup language, to make up pages for viewing, one or more data chunks including a list of elements to be used to make up part of a page.

10. The system of claim 1, wherein one or more data chunks contains information on how to relate to a feature to a generic (unspecified) communication device such as stipulating a percentage of the screen width or height to be taken up by a graphic.

11. The system of claim 10, wherein the system separately adapts the data chunks by applying the information on how to relate to a generic device to an identified device, or type of device such as adapting the percentage of screen requirement to be a requirement for a graphic to be displayed as a specific number of pixels high or wide.

12. The system of claim 1, wherein one or more page structures are editable so that chunks in the list can be added and/or deleted and/or the order of chunks can be changed.

13. The system of claim 1, wherein settings or contents of a chunk are editable.

14. The system of claim 13, wherein edited and unedited version of a chunk are both stored in the memory, preferably the system is configured to allow new pages to be designed based on existing pages by editing one or more chunks in the list of the page structure corresponding to the existing page and creating a new page structure which includes the edited chunk in the list of a new page structure corresponding to the new page.

15. The system of claim 1, wherein at least one particular data chunk is used to compile more than one page corresponding to different page requests.

16. The system of claim 1, wherein at least one particular data chunk is used to compile more than one page corresponding to different page requests, and wherein a plurality of page structure lists share at least one chunk but do not contain all the same chunks in the same order.

17. The system of claim 1, wherein the system compile a majority of the compiled page from the data chunks or a majority of the viewable page displayed on the mobile telephone corresponds to restored data chunks.

18. The system of claim 17, wherein the majority of the page is made up from adapted chunks.

19. A method of generating mobile internet pages for viewing by mobile communication devices configured for each device, the method comprising:

processing a page request from an identified communication device;

selecting a page structure of the requested page from a page repository that contains a plurality of page structures, one or more page structures comprising a list of a plurality of data chunks stored in a memory, wherein each data chunk has a specific purpose/function on a completed mobile internet page;

identifying the data chunks listed in the selected page structure;

retrieving from a database a specific profile relating to the identified communication device, the database comprising data relating to a plurality of mobile communication devices of different configurations and information on adaptations to be made to data chunks corresponding to the different configurations;

using the specific profile to separately adapt each of the identified data chunks in accordance with the profile; and compiling a mobile internet page by combining the separately adapted data chunks before sending to the identified mobile communication device.

20. The method of claim 19, further comprising identifying the mobile communication device or type of mobile communication device.

21. A non-transitory computer readable media including program instructions which when executed by a processor cause the processor to generate mobile internet pages for viewing by mobile communication devices configured for each device, wherein the processor performs the following steps:

processing a page request from an identified communication device;

selecting a page structure of the requested page from a page repository that contains a plurality of page structures, one or more page structures comprising a list of a plurality of data chunks stored in a memory, wherein each data chunk has a specific purpose/function on a completed mobile internet page;

identifying the data chunks listed in the selected page structure;

retrieving from a database a specific profile relating to the identified communication device, the database comprising data relating to a plurality of mobile communication devices of different configurations and information on adaptations to be made to data chunks corresponding to the different configurations;

using the specific profile to separately adapt each of the identified data chunks in accordance with the profile; and compiling a mobile internet page by combining the separately adapted data chunks before sending to the identified mobile communication device.

22. The system of claim 2, wherein the system compiles the page from page components corresponding to the chunks vertically stacked in the set order.

23. The method of claim 19, further comprising transmitting the page back to the mobile device in response to the request.

24. The computer readable media of claim 21, wherein the processor further performs transmitting the page back to the mobile device within a reasonable time period in response to the request.

* * * * *